(12) United States Patent
Calderone et al.

(10) Patent No.: US 9,956,545 B2
(45) Date of Patent: May 1, 2018

(54) CORE-SHELL PARTICLES WITH CATALYTIC ACTIVITY

(71) Applicant: TOTAL RAFFINAGE CHIMIE, Courbevoie (FR)

(72) Inventors: Vincenzo Roberto Calderone, Delft (NL); Nirappurackal Raveendran Shiju, Amsterdam (NL); Gad Rothenberg, Oegstgeest (NL); Daniel Curulla-Ferre, Courbevoie (FR)

(73) Assignee: Total Raffinage Chimie, Courbevoie (FR)

( * ) Notice: Subject to any disclaimer, the term of this patent is extended or adjusted under 35 U.S.C. 154(b) by 0 days. days.

(21) Appl. No.: 15/237,233

(22) Filed: Aug. 15, 2016

(65) Prior Publication Data

US 2016/0354762 A1 Dec. 8, 2016

Related U.S. Application Data

(62) Division of application No. 14/118,748, filed as application No. PCT/EP2012/060501 on May 30, 2012, now Pat. No. 9,539,563.

(30) Foreign Application Priority Data

May 30, 2011 (EP) .................................... 11305657

(51) Int. Cl.
*B01J 23/00* (2006.01)
*B01J 23/75* (2006.01)
(Continued)

(52) U.S. Cl.
CPC ............ *B01J 23/75* (2013.01); *B01J 23/745* (2013.01); *B01J 35/002* (2013.01);
(Continued)

(58) Field of Classification Search
CPC .... B01J 23/75; B01J 35/0006; B01J 35/0013; B01J 23/745; B01J 37/0072; B01J 37/0217; B01J 37/32; B01J 37/031; B01J 35/08; B01J 37/06; B01J 35/002; B01J 37/0225; B01J 37/0221; B01J 35/008; B01J 37/0009; C10G 2/332
(Continued)

(56) References Cited

FOREIGN PATENT DOCUMENTS

CN            101786601 A   *   7/2010

OTHER PUBLICATIONS

Pankhurst et al. "Progress in applications of magnetic nanoparticles in biomedicine" Journal of Physics D: Applied Physics, vol. 42, No. 22 Jun. 11, 2009.*

(Continued)

*Primary Examiner* — Haytham Soliman
(74) *Attorney, Agent, or Firm* — Albert Shung

(57) ABSTRACT

The present invention pertains to novel core-shell particles comprising a core of iron oxide and a shell of cobalt oxide, characterized in that they are spherical with a number average diameter, as measured by TEM, of between 1 and 20 nm. This invention is also directed to their uses in the manufacture of a catalyst, and to the method for preparing these particles, by precipitating cobalt oxide onto magnetite or hematite particles which are themselves precipitated from Fe(III) and optionally Fe(II) salts.

7 Claims, 2 Drawing Sheets

(51) Int. Cl.
    *B01J 35/00*     (2006.01)
    *B01J 37/02*     (2006.01)
    *B01J 37/03*     (2006.01)
    *B01J 37/06*     (2006.01)
    *B01J 37/32*     (2006.01)
    *B01J 35/08*     (2006.01)
    *B01J 23/745*     (2006.01)
    *B01J 37/00*     (2006.01)
    *C10G 2/00*     (2006.01)
    *B01J 37/18*     (2006.01)

(52) U.S. Cl.
    CPC ......... *B01J 35/0006* (2013.01); *B01J 35/008* (2013.01); *B01J 35/0013* (2013.01); *B01J 35/08* (2013.01); *B01J 37/0072* (2013.01); *B01J 37/0217* (2013.01); *B01J 37/0221* (2013.01); *B01J 37/0225* (2013.01); *B01J 37/031* (2013.01); *B01J 37/06* (2013.01); *B01J 37/32* (2013.01); *C10G 2/332* (2013.01); *B01J 37/0009* (2013.01); *B01J 37/18* (2013.01)

(58) Field of Classification Search
    USPC .......................................................... 502/325
    See application file for complete search history.

(56) References Cited

OTHER PUBLICATIONS

Machine Translation of CN 101786601A, dated Jul. 28, 2010.*
A.E. Berkowitz et al. Toward a model for Co-surface-treated Fe-oxides IEEE Transactions on Magnetics (vol. 24, Issue: 6, Nov. 1988) pp. 2871-2873.*

* cited by examiner

US 9,956,545 B2

CORE-SHELL PARTICLES WITH CATALYTIC ACTIVITY

CROSS-REFERENCE TO RELATED APPLICATIONS

This application is a divisional of U.S. patent application Ser. No. 14/118,748, filed Nov. 19, 2013, which claims the benefit of PCT/EP2012/060150, filed May 30, 2012, which claims priority from EP 11305657.6, filed May 30, 2011.

FIELD OF THE INVENTION

The present invention pertains to novel core-shell particles, to the method for preparing same, and to their uses in the manufacture of a catalyst.

BACKGROUND OF THE INVENTION

Many chemical and petrochemical reactions are performed in the presence of catalysts comprising transition metals, such as platinum or cobalt, which are very expensive. Attempts have thus been made to propose particles comprising one of these transition metals mixed with a less expensive metal.

As far as cobalt is concerned, it has been suggested in EP 0 261 870 to use in the conversion of syngas to hydrocarbons (in the so-called Fischer-Tropsch process), after reductive activation, a catalyst made from core-shell particles having a core of zinc oxide and a shell comprising cobalt oxide. These particles may be produced either by co-precipitation of insoluble thermally decomposable compounds of zinc and cobalt, or by precipitation of an insoluble thermally decomposable compound of cobalt in the presence of zinc oxide. Typically, the insoluble thermally decomposable compounds are formed from metal oxides obtained by adding a precipitant such as a base to an aqueous solution of the corresponding metal salts. The drawback of the co-precipitation method is that the size of the particles cannot be properly controlled, which in turn detrimentally affects the conversion rate and selectivity of the catalytic process in which these particles are used.

Moreover, the catalytic activity of the particles obtained according to these two methods need to be improved. Another method to prepare core-shell catalysts has been proposed in U.S. Pat. No. 7,422,995 and is referred to as the layer-by-layer (or "LBL") method. Again, the catalytic activity of the particles can be improved. Moreover, it involves several steps and the use of a surfactant to anchor the cobalt layer to the chemically inert core coated with a zinc oxide layer, which increases the cost of this method.

Other core-shell materials have been proposed for catalytic applications (J. BAO et al., Angewandte Chemie, International Edition in English, vol. 47, pp. 353-356, 2008; J. M. BADANO et al., Applied Catalysis A., Vol. 390, pp. 166-174, 2010). They include an active phase, generally a transition metal, which is set as the core of the composite particle. This active core is then coated with a protective shell, such as mesoporous silica, titania or carbon nanotubes. Covering the active phase with a protective shell can prevent sintering, while allowing reactants and products to diffuse through the catalyst. However, the system is severely affected by the diffusion limitation across the shell. Examples of such core-shell catalysts have been used in Fischer-Tropsch reactions (R. XIE et al., *Catalysis Communications*, Vol. 12, pp. 380-383 and pp. 589-592, 2011).

Therefore, there remains the need to provide a cost-effective method for preparing core-shell metal particles intended to be used in the manufacture of a catalyst which comprises a much lower amount of cobalt than known catalysts while having at least the same catalytic activity.

This need has been satisfied by a novel method which leads to specific particles having a core of iron oxide and a shell comprising cobalt. Moreover, to the inventors' knowledge, these particles have never been described before.

Specifically, core-shell particles having a core of iron oxide and a shell comprising cobalt, and other cobalt-doped iron oxide particles, have already been described in various documents such as U.S. Pat. Nos. 6,080,233, 5,512,317, 5,484,628, 5,183,709, 4,276,183, 4,226 909, 4,420,537 and U.S. Pat. No. 3,573,980. These particles are intended to be used as magnetisable particles in magnetic recording tapes which require both a high coercivity and a good orientation ratio of the particles in a binder. These particles have an acicular shape, resulting from their preparation processes. These processes use acicular iron oxides as starting materials, which are treated in a basic aqueous solution so as to form a core of magnetite, berthollide or $\gamma\text{-}Fe_2O_3$, having a size of more than 20 nm and most often more than 100 nm. A cobalt salt (and optionally other metallic salts or a silicate) is added to the iron compound either before or after the formation of the core, so as to result in a shell comprising cobalt and optionally iron or chromium (and optionally a silicate). Similar processes have been disclosed by A. E. Berlowitz et al in *IEEE Transactions on Magnetics*, Vol. 24, No. 6, November 1988, by M. KISHIMOTO et al in *IEEE Transactions on Magnetics*, Vol.Mag-21, No. 6, November 1985, by H. SESIGUR et al. in *Materials Research Bulletin*, Vol. 31, No. 12, pp.1581-1586, 1996 and by K. SAKAI et al. in *J. Appl. Crystal.*, Vol. 34, pp. 102-107, 2001.

The above prior art does not suggest that spherical particles, having a core of iron oxide of less than 100 nm, and even less than 20 nm, and a shell comprising cobalt, can be produced. Moreover, these documents do not suggest the simple and inexpensive method of this invention, which may be carried out to produce these particles with a controlled shell thickness.

SUMMARY OF THE INVENTION

In one aspect, the present invention is thus directed to a method, for the preparation of spherical core-shell particles, comprising the successive steps consisting of:
(a) preparing an aqueous solution comprising a ferric salt, at a temperature of less than 50° C.;
(b) adding at least one base to said solution, so as to obtain a suspension of iron oxide particles having a pH value of from 10 to 14;
(c) washing the suspension;
(d) adding a strong acid to the washed suspension to peptize it;
(e) reacting at least one base with said peptized suspension, until the pH reaches a value from 10 to 14, at a temperature of from 50 to 95° C.,
(f) adding a cobalt salt to the heated suspension in order to obtain spherical particles having a core of iron oxide and a shell comprising cobalt oxide.

It is understood that the above method may comprise other preliminary, intermediate or subsequent steps, as long as they do not impair the structure and properties of the core-shell particles obtained.

In another aspect, this invention pertains to the core-shell particles which may be obtained according to the above method.

In yet another aspect, this invention is directed to core-shell particles comprising a core of iron oxide and a shell of cobalt oxide, characterized in that they are spherical with a number average diameter, as measured by TEM, of between 1 and 20 nm. In a preferred embodiment, the core consists in magnetite or hematite and the shell consists in cobalt oxide.

In yet another aspect, this invention pertains to the use of these core-shell particles to manufacture a catalyst.

In still another aspect, this invention pertains to a catalyst comprising an inert porous carrier containing core-shell particles as defined above.

DETAILED DESCRIPTION

This invention will now be described in further details. In the following description, the expression "comprised between" should be understood to designate the range of values identified, including the lower and upper bounds.

The novel method of this invention for the preparation of core-shell particles mainly involves the precipitation of iron oxide particles from iron salts, so as to form a magnetite ($Fe_3O_4$) or hematite ($Fe_2O_3$) core, followed by the addition of a cobalt salt, in a hot basic medium, in order to precipitate a cobalt oxide shell ($Co_3O_4$) around said core.

Specifically, in the first step of this method, an aqueous solution is prepared, which comprises a ferric or Fe(III) salt, optionally mixed with a ferrous or Fe(II) salt in a molar ratio of Fe(III) to Fe(II) of 2:1. These salts may be independently chosen from, for instance, nitrate, chloride and hydroxide salts, with chloride salts being preferred. Preferably, sulphate salts will not be used. The solution of these salts in water is maintained at, or brought to, a temperature of less than 50° C., preferably comprised between 15 and 40° C. and more preferably comprised between 20 and 30° C. This solution generally comprises no other compound than the above salts, especially no other salt and/or no surfactant.

To this solution is then added at least one base so as to obtain an aqueous suspension of iron oxide(s). This base is preferably ammonium hydroxide, although other bases such as sodium or potassium hydroxide may be used. This addition is performed until a pH of from 10 to 14 is reached, generally while stirring the solution.

At this point, one obtains a suspension containing hematite particles ($Fe_2O_3$) or magnetite particles ($FeO.Fe_2O_3$ also designated by $Fe_3O_4$), depending on whether only Fe(III) or a mixture of Fe(III) and Fe(II) was used, respectively. This suspension is then washed with water, preferably at 10-40° C., for instance at 10-30° C., so as to remove the excess ions, before adding a strong acid, such as nitric acid or hydrochloric acid, to the washed suspension. The function of this strong acid is to peptize the suspension, i.e. both destroy loose aggregates of iron oxide(s) and stabilize the suspension. It may also be useful to complete the oxidation of ferric and optionally ferrous salts into iron oxide'(s), if necessary, provided that the suspension is heated, for instance up to 100° C. Usually, this strong acid is added until a pH of from 3 to 5 is attained.

The iron oxide particles thus obtained have a spherical shape with a number average diameter, as measured by Transmission Electron Microscopy (TEM), comprised between 1 and 20 nm and preferably between 3 and 15 nm, which has been shown to be dependent on the precipitation pH.

In a further step of the method according to this invention, a base is added to the suspension of magnetite particles, until a pH of from 10 to 14 is reached. This base may be chosen from those listed above, among which sodium hydroxide is preferred. The addition of this base is generally performed while stirring the suspension.

This base is reacted with the suspension of iron oxide particles at a temperature of from 50 to 95° C. and preferably comprised between 60 and 70° C. The suspension may either be heated first, then reacted with the base, or first reacted with the base and then heated.

A solution of cobalt salt is then added slowly to this suspension, for instance at a rate of from 0.1 to 0.5 ml/min. This salt may be chosen from cobalt chloride, cobalt nitrate, cobalt sulphate and their hydrates and mixtures, wherein cobalt nitrate is preferred. The addition of this salt is also usually carried out while stirring the suspension. In this step of the method, at least one other metal salt may be added, especially salts of catalytic promoters such as platinum, manganese or ruthenium and their mixtures. The amount of cobalt salt, and optionally other salts, used depends on the thickness of the cobalt oxide shell that is to be formed around the magnetite core particles.

This step leads to the formation of core-shell particles having a number average diameter, as measured by TEM, comprised between 2 and 30 nm and preferably between 3 and 15 nm, and a weight ratio of cobalt to iron comprised between 1 and 70%, preferably from 10 to 65% and more preferably from 15 to 60%. The lower this ratio, the higher the cost savings compared to usual cobalt particles used in catalysts. This ratio should however be properly chosen in view of the reaction in which these particles are intended to be used, so as to provide the required catalytic activity.

As evident from the foregoing, the method according to this invention is simple, with only a few steps, it need not be carried out under specific conditions, for instance under inert atmosphere. Moreover, this method does neither generate hazardous by-products, nor contaminated waters, and uses standard low-cost chemicals.

As mentioned above, the core-shell particles of this invention are novel. They comprise a core of iron oxide and a shell of cobalt oxide and they are spherical with a number average diameter, as measured by TEM, of between 1 and 20 nm. As described above, the core preferably consists in magnetite or hematite and the shell consists in cobalt oxide. Usually, these particles do not include any other metal oxide.

They may be used to manufacture catalysts involved in Fischer Tropsch reactions or in other chemical reactions such as the hydrogenation of nitriles into primary amines or in hydroformylation processes.

The Fischer-Tropsch process generally comprises the following process steps. The first step involves reacting a source of carbon (such as coal, natural gas or biomass) with a source of oxygen (such as steam, air or oxygen) to form a mixture of carbon monoxide and hydrogen, usually referred to as syngas. The second step involves contacting the syngas with a Fischer-Tropsch catalyst including the particles of this invention, which leads to hydrocarbons and water. Depending on the process conditions and the catalyst used, the nature of the hydrocarbons and the chain length may vary. The main products of the Fischer-Tropsch reaction are linear olefins and paraffins and water. The third step involves isomerisation of the hydrocarbons formed in the second step to produce more valuable products. For instance, the longer chains in the product may be cracked to form products in the diesel or gasoline range, and linear paraffins may be isomerised to improve diesel product properties such as cloud point and pour point. Generally, adapted hydrotreating catalysts are used for this third step.

Whatever the reaction in which they are used, the core-shell particles of this invention are usually included within and/or adsorbed on an inert porous carrier so as to form a catalyst. This carrier may be a porous inorganic refractory oxide, more preferably alumina, silica, titania, zirconia or mixtures thereof. Alternatively, it may be chosen from aluminosilicates such as zeolithes. This carrier is usually beneficial to the retention of the core-shell structure under reducing conditions. Usually, the core-shell particles are impregnated onto the carrier, which preferably has a pore size of at least 40 nm. To this end, a particle suspension with a concentration of from 5 to 20 g/l may be used, and water may be slowly removed after impregnation.

The optimum amount of core-shell particles present in the carrier may vary, depending on the catalytic activity required. Typically, the amount of cobalt present in the catalyst may range from 1 to 25% by weight of catalyst, for instance from 10 to 20% by weight of catalyst. Other promoters, if present, may represent from 0.5 to 5% by weight of catalyst. The promoters may be present as metals or as the metal oxide, depending upon the particular promoter concerned. Suitable promoters include oxides of metals from Groups IVB, VB and/or VIIB of the Periodic Table, oxides of the lanthanides and/or the actinides. Preferably, the catalyst comprises at least one oxide of titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

According to an embodiment of this invention, the core-shell particles described above may be used to manufacture a catalyst comprising from 3 to 8% by weight of cobalt, from 0.2 to 1% by weight of ruthenium and from 0.5 to 1.5% by weight of platinum.

When fresh prepared, the catalyst may be shaped or formed by means of spray drying, pelletizing, (wheel) pressing, extrusion, or application on a metal support like a metal wire. The core-shell particles and/or any promoter may be added to the carrier material before or after shaping. The catalyst suitably has an average diameter of 0.5-15 mm. One form of catalyst is as an extrudate. Such extrudates suitably have a length of 2-10 mm, and a cross section suitably of 1-6 mm$^2$, especially 2-3 mm$^2$.

After shaping, the catalyst may be strengthened by calcination. The calcination thereof in a manner known in the art. The calcination temperature depends on the carrier material used.

Activation of a fresh prepared catalyst can be carried out in any known manner and under conventional conditions. For example, the catalyst may be activated by contacting it with hydrogen or a hydrogen-containing gas, typically at temperatures of about 200° C. to 350° C.

The catalyst may then be used as a slurry catalyst or preferably as a fixed bed catalyst. For instance, if developed for carrying out the Fischer-Tropsch reaction, this catalyst may be used in fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebullated bed reactors.

BRIEF DESCRIPTION OF THE DRAWINGS

This invention will be further understood in light of the following non-limiting examples which are given for illustration purposes only, and also in connection with the attached drawings in which.

EXAMPLES

Example 1

Synthesis and Characterization of Core-Shell Particles

Magnetite particles were first synthetized via a slightly modified Massart method. To this end, 9.02 g of FeCl$_3$.xH$_2$O and 3.26 g of FeCl$_2$.xH$_2$O were mixed together in 380 ml of water. To this solution were added from 10 to 40 ml of ammonia: magnetite formation was visible as a black precipitate. The particles were washed with 300 ml water, until the pH of the supernatant was constant. The magnetite particles were then peptized with 40 ml of a 2M HNO$_3$ solution. The precipitate was recovered with a magnet and redispersed in water.

The following Table 1 summarizes the size of the magnetite particles as a function of the ammonia amount:

TABLE 1

| NH$_4$OH (ml) | Particle size (nm) |
|---|---|
| 10 | 12.2 |
| 20 | 7.6 |
| 40 | 3.5 |

50 ml of a 20 g/l magnetite suspension were then mixed with 10 ml of NaOH solution. The mixture was heated up to 70° C. Then 10 ml of a Co(NO$_3$)$_2$.xH$_2$O solution was slowly added to the magnetite suspension at the speed of 0.2 ml/min. The Co concentration in the solution was chosen so as to achieve a final Co/Fe wt % varying in the 3-60% range.

The precipitate was then washed with water, the supernatant was removed and the so-obtained slurry was freeze-dried. The particle suspensions show an extended stability in a wide range of pH values. The isoelectric point is at pH=7-8. At pH below 2, the particles dissolve and at pH above 12 the ionic strength is high and the particles settle quite fast.

Figure 1:
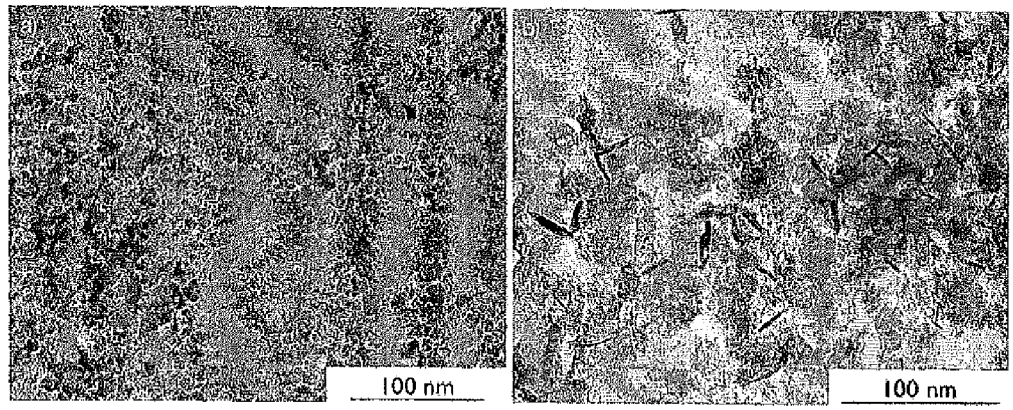
FIG. 1 is a TEM image showing, on the left side, core-shell particles of this invention and, on the right side, platelets of cobalt oxide.

Mean iron particle size, calculated on the basis of the TEM image analysis, is comprised in the 3-12 nm range and inversely proportional to the amount of ammonia used in the synthesis. The polydispersity of the systems (span=0.6) is in agreement with similar aqueous procedures reported in the literature. The image analysis of the Co coated particles showed no homogeneous nucleated Co oxide particles (see FIG. 1a which illustrates core-shell particles of about 7.5 nm). A control experiment further showed how, with no magnetite particles in the hot basic solution, Co oxide precipitates as hexagonal plates of about 20 nm (see FIG. 1b).

Figure 2:
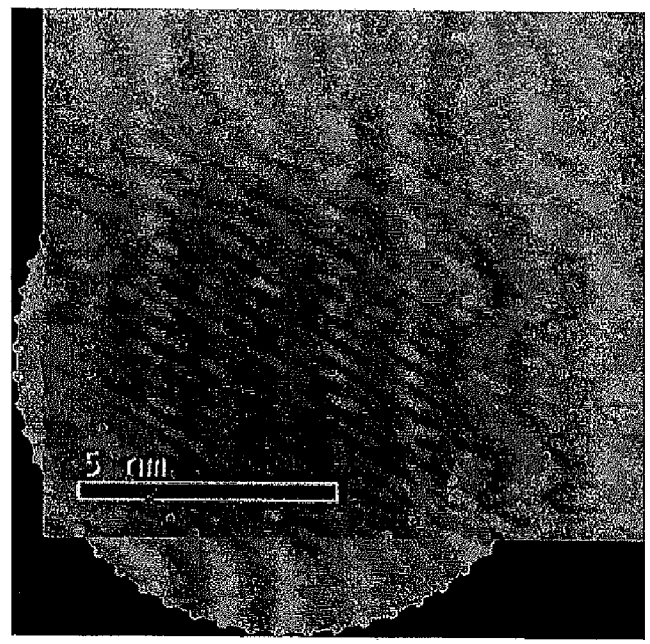
FIG. 2 is a HR-TEM image of a core-shell particle of this invention.

Moreover, there appeared to be no statistically relevant size difference between the pure magnetite particles and the Co-coated ones. Rather, as evident from the EDX analysis, Co-enriched regions are formed on the top of the magnetite particles. High resolution TEM (HR-TEM) characterization also provided visual evidence of this new layer, as shown on FIG. 2 which illustrates core-shell particles with a Co/Fe ratio of 60 wt %. The Co-rich phase is visible as a lighter region on the surface of the particles. Furthermore, lattice fringes analysis showed that core and shell crystal structure are aligned on the same direction.

Figure 3:
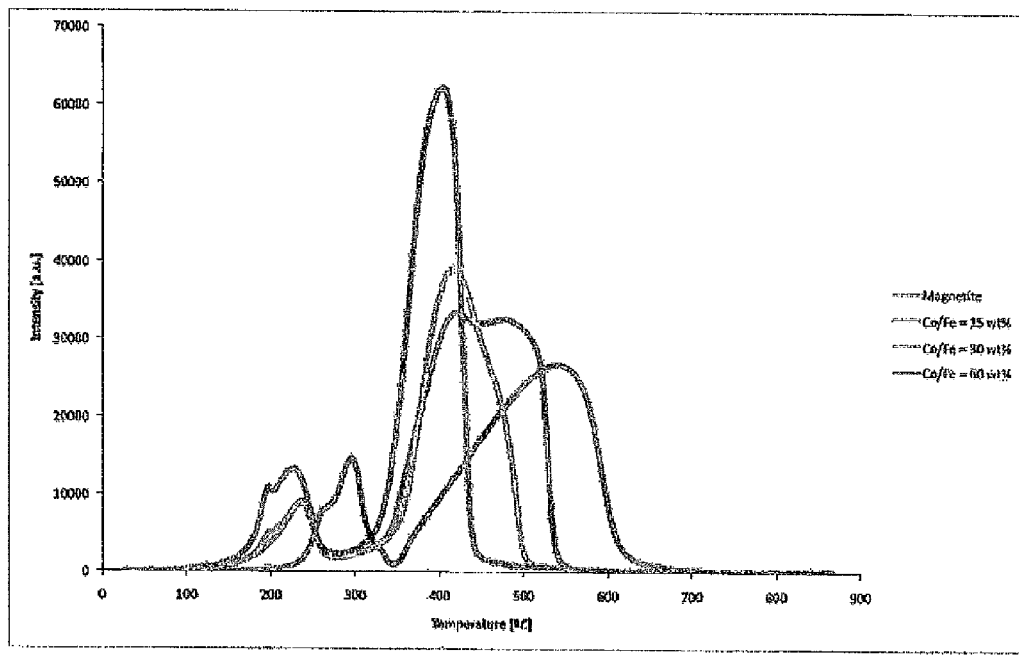
FIG. 3 is a TPR plot of core-shell particles of this invention compared to magnetite.
Figure 4:
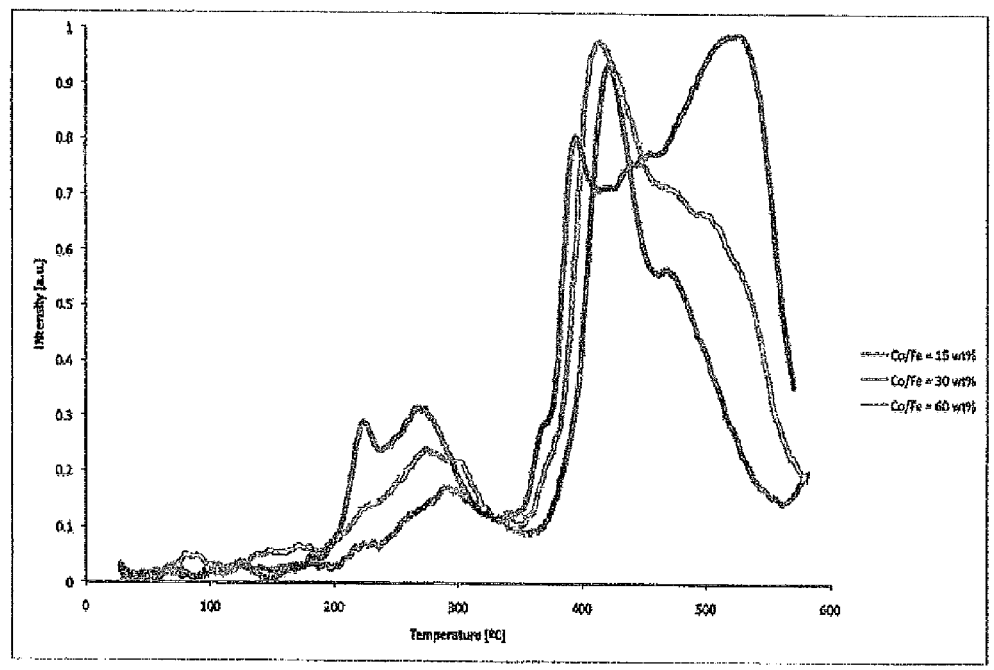
FIG. 4 is a TPR plot of core-shell particles of this invention adsorbed on a porous carrier.

TPR characterizations were also performed on freeze-dried powders by flowing a 5% $H_2$ in $N_2$ mixture at 40 ml/min, heating the samples at 5° C./min. The TPR characterization as well supports the presence of a core-shell structure. The behaviour in a reducing environment of these iron oxide particles perfectly matched magnetite TPR profile reported in the literature. From the TPR plots illustrated on FIG. 3, one could derive that the part of the Co interacted with the magnetite structure, influencing Fe reducibility, and that part of it also contributed to the formation of the cobalt-rich shell. The reduction rate was so fast in any way that the presence of pure $Co_3O_4$ and $Fe_3O_4$ phases could not be detected.

Similar TPR plots of these core-shell particles supported on mesoporous silica (EMS 385 supplied by Eurosupport as extrudates) having a mean pore size of 41 nm (span=0.7), a specific pore volume of 0.47 $cm^3/g$ and a specific surface area of 125 $m^2/g$ showed, on the contrary, that the Co-rich and the iron-rich phases of the core-shell particles behaved more closely like pure $Co_3O_4$ and $Fe_3O_4$ when increasing the Co/Fe ratio. It could then be derived that the support had a beneficial affect in the retention of the core-shell structure under reducing conditions.

The invention claimed is:

1. Core-shell particles obtained according to a method comprising:
   (a) preparing an aqueous solution comprising a ferric salt, at a temperature of less than 50° C.;
   (b) adding at least one base to said aqueous solution, so as to obtain a suspension of iron oxide particles having a pH value of from 10 to 14;
   (c) washing the suspension;
   (d) adding a strong acid to the washed suspension to peptize the washed suspension;
   (e) reacting at least one base with said peptized suspension, until the pH reaches a value from 10 to 14, at a temperature of from 50 to 95° C.;
   (f) adding a cobalt salt to the heated suspension in order to obtain spherical particles having a core of iron oxide and a shell comprising cobalt oxide, wherein the spherical particles comprise a core of iron oxide and a shell of $Co_3O_4$, characterized in that the core-shell particles are spherical with a number average diameter, as measured by TEM, of between 1 and 20 nm.

2. The core shell particles according to claim 1, characterized in that the aqueous solution comprising the ferric salt further includes a ferrous salt in a molar ratio of Fe(III) to Fe(II) of 2:1, whereby the iron oxide particles are magnetite particles.

3. The core shell particles according to claim 1, characterized in that the ferric salt is ferric nitrate, ferric chloride or ferric hydroxide.

4. The core shell particles according to claim 2, characterized in that the ferrous salt is ferrous nitrate, ferrous chloride or ferrous hydroxide.

5. The core shell particles according to claim 1 characterized in that the cobalt salt is cobalt nitrate, cobalt chloride or cobalt sulphate.

6. The core shell particles according to claim 1, characterized in that the strong acid is nitric acid or hydrochloric acid.

7. Core-shell particles according to claim 1, characterized in that the core comprises magnetite or hematite and the shell comprises $Co_3O_4$.

* * * * *